Nov. 18, 1969  R. N. THOMPSON  3,479,046
ALL-SEASONS SLED
Filed Aug. 7, 1967  2 Sheets-Sheet 1

INVENTOR:
RAY N. THOMPSON.
BY:
B. Dean Cuddle
ATTORNEY.

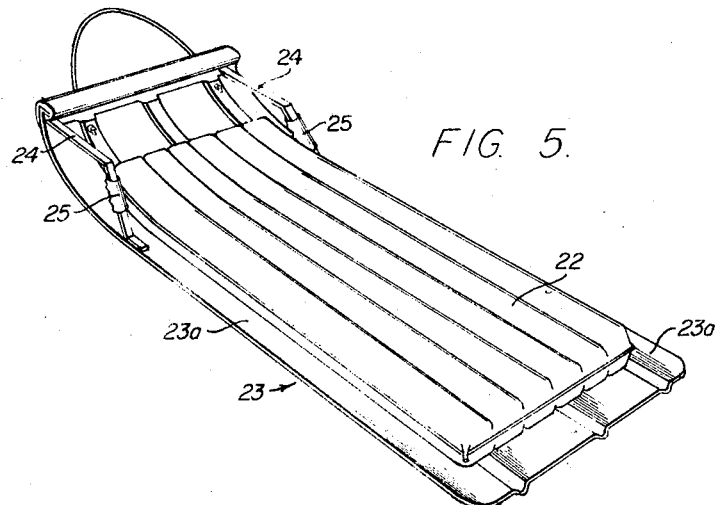
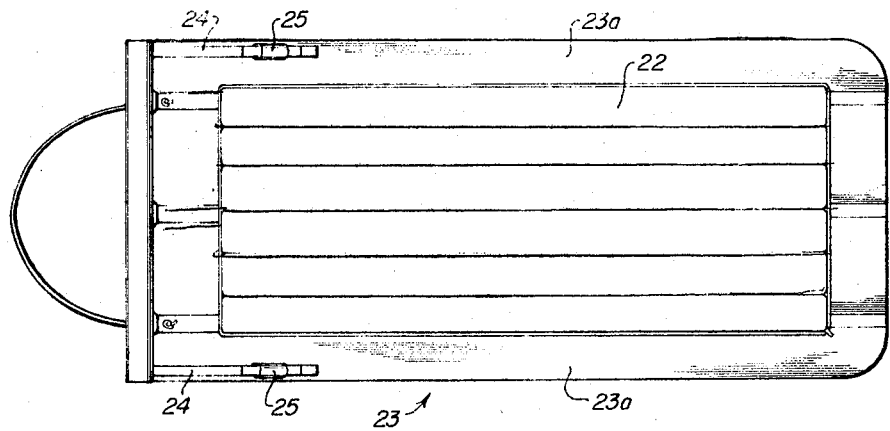
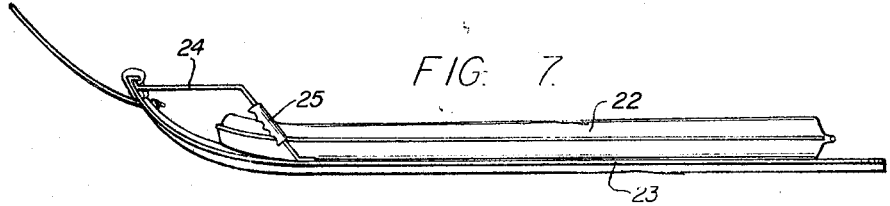
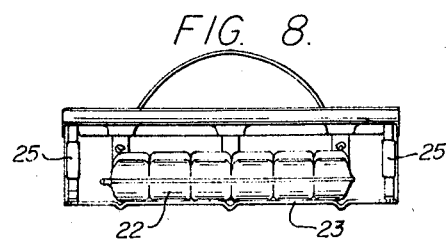
INVENTOR:
RAY N. THOMPSON.
BY:
B. Dean Giddle
ATTORNEY.

ved Nov. 18, 1969

3,479,046
ALL-SEASONS SLED
Ray N. Thompson, 4096 West 5010 South,
Kearns, Utah 84118
Filed Aug. 7, 1967, Ser. No. 658,669
Int. Cl. B62b 15/00, 17/00
U.S. Cl. 280—18                                    6 Claims

ABSTRACT OF THE DISCLOSURE

A steerable sled for use on snow, water, or the like, including a base of strong, but lightweight and flexible sheet material having guide runners on its bottom and a resilient, shock-absorbing riding surface fixed to its top.

Brief description

In the past there have been a great many sleds developed for use in either the winter, on snow, or in the summer, on water, but, so far as I am aware, there has not heretofore been one developed that can be satisfactorily used on either, or on such other surface materials as may be suitable for sledding. Such other surfaces might include, for example, artificial snows, artificial ski hills and sand.

The prior sleds, with which I am familiar, have generally included a rigid riding surface, with upstanding runners therebeneath or with a flat bottom surface, such as it often found on a toboggan. While these sleds may be satisfactory for their intended purpose, their use is limited usually to sliding on snow, and the ride they give is rough and jolting.

I am also aware of some inflatable "sleds" that are supposedly usable on either snow or water. These have been constructed of lightweight, flexible, sheet materials that are subject to being easily punctured or torn and because the sleds constructed from them are so flexible they cannot be steered, even by a rider shifting his body weight. Because of their flexibility, they also tend to distort and collapse when moved over or through water at any rapid speed.

It is an object of the present invention to provide a sled that can be used equally well on snow or on water and that will give a controlled, fast and comfortable ride.

Principal features of the invention include a strong, but somewhat flexible, base made out of a lightweight material that is wear resistant and not subject to being easily damaged and that has small, longitudinal guide runners on the bottom surface. The base curves upwardly at the front end of the sled to form a toboggan-type nose that is reinforced and cushioned to prevent injury to a rider. A resilient, and preferably air filled pad is fixed to the top surface of the base to serve as a shock-absorbing, riding surface. The pad, whether of one piece or of several members joined together or spaced along the base, is buoyant, so that when the sled is used on water the rider's head will always be supported above the water surface.

Additional objects and features will become apparent from the following detailed description and drawings, disclosing what are presently contemplated as being the best modes of the invention.

The drawings

Figure 1:
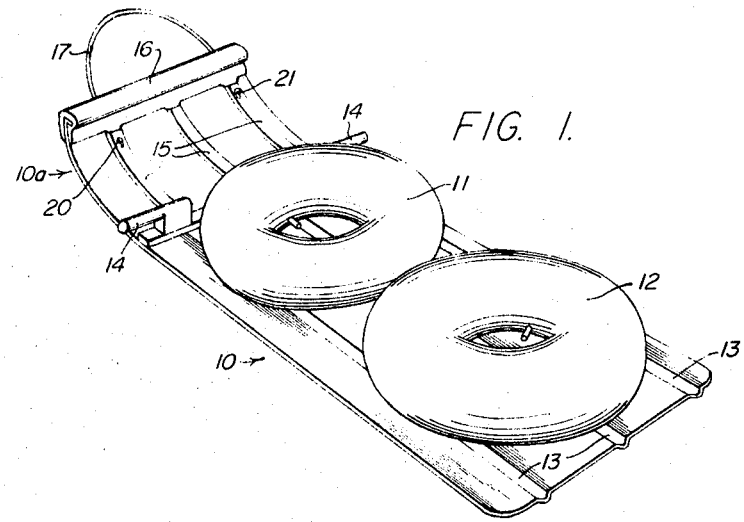
Figure 2:
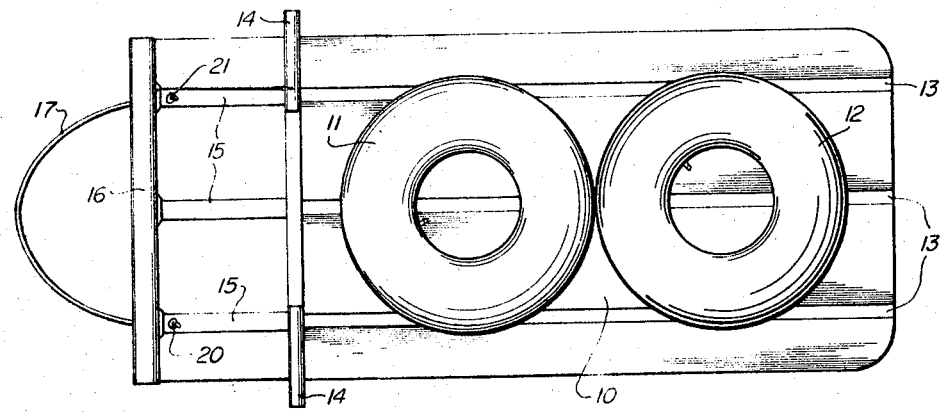
Figure 3:
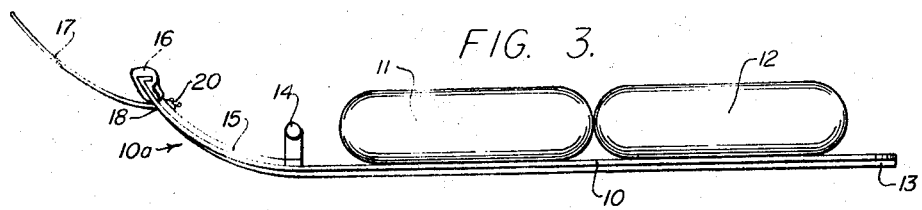
Figure 4:
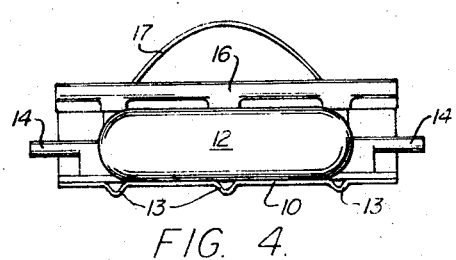

FIG. 1 is a perspective view of one embodiment of the invention;
FIG. 2, a top plan view;
FIG. 3, a side elevation view;
FIG. 4, a rear elevation view;
FIG. 5, a view like FIG. 1, but showing another embodiment of the invention;
FIG. 6, a side elevation view of the embodiment of the invention shown in FIG. 5;
FIG. 7, a top plan view; and
FIG. 8, a rear elevation view.

Detailed description

Referring now to the drawings:

In the embodiment of the invention shown in FIGS. 1–4, the sled is shown comprising a base 10 and a riding surface made out of two pneumatic rings 11 and 12, adhesively bonded to the base.

Corrugations protruding slightly beneath the base serve as longitudinal guide runners 13 for the sled. At its forward end 10a the base is curved upwardly into a toboggan-type nose that will guide the sled over uneven terrain and that will deflect a great deal of the water, snow, or other surfaces material away from a rider on the sled.

The base is preferably made out of a lightweight material such as a sheet of aluminum, plastic or fiber glass that is somewhat flexible, even though strong enough to withstand hard usage. The flexibility of the base allows it to yield slightly with impact and to somewhat follow the contour of the surface on which it is being used, thereby reducing shock to a rider.

The guide runners 13 allow the sled to be steered, since a rider on the sled can merely shift his weight by leaning to one side or the other and force the runner on the side receiving the weight down into the snow or other such surface material. This causes the sled to turn in the direction of lean. At least two such runners are used, one at each side of the base, so that they will turn the sled as the rider shifts his body weight, but one or more central runners can also be used to stabilize the sled as it travels straight ahead. The turning can be accomplished on any of the sledding surfaces heretofore described, including water.

The substantially flat expanse making up most of the under surface of the base skims over the water surface when the sled is towed behind a boat, and because of the buoyant, lightweight construction, very little power is required to pull the sled and rider out of the water. A five horsepower outboard motor equipped boat will, for example, easily pull the sled and a two-hundred-pound rider over the surface of the water.

The air-filled rings 11 and 12 provide a resilient surface on which a rider can sit or lie. If more than one person rides on the sled at the same time they can sit in and, if desired, between the rings, with those behind the first rider placing their feet on the portions of the base extending outwardly from the rings. The marginal support afforded by the rings holds the riders off the base and provides a cushioned ride.

The front rider, if there are more than one, or a sole, sitting, rider will place his feet against handles 14, fixed to the base 10 ahead of ring 11 and projecting outwardly therefrom. The handles serve to assist the rider in maintaining balance and also serve as reaction members as he shifts his weight to steer the sled.

If desired a rider can lie on the air-filled rings and grasp handles 14.

The curved portion 10a of the base is preferably reinforced by spaced, curved strips 15, fixed to the inside of the curved portion 10a. This reinforcement prevents the nose being pushed into the rider or riders should the sled collide with a solid object, and keeps the nose from collapsing under the impact of water, while being towed.

A soft rubber nosepiece 16 fits over and cushions the inturned end of the nose end of bottom 10 to protect a rider against injury that might otherwise result from his hitting the inturned end.

A rope 17 has its ends inserted through holes 18 and 19 through base 10 and a pair of the reinforcement strips 15 and the ends are knotted at 20 and 21, respectively, so that they will not be pulled from the holes. The rope can be held by a rider for support when the sled is being used, as on a downhill snow covered slope, and can be used to pull the sled back up the hill. When being pulled by a vehicle, whether over snow, or on water, a tow rope, not shown, can be connected to the center of rope 16 to provide even pulling on the sled.

When the sled is used on water it will usually be pulled behind a boat. The sled and its rider or riders may sink slightly below the water surface before the sled is moved, but the buoyant rings 11 and 12 prevent complete sinking and hold the rider or riders heads above water. As soon as the tow boat obtains sufficient speed, the sled and rider or riders come to the surface of the water and the bottom of the sled skims thereover.

While the resilient rings 11 and 12 have proven very comfortable and effective to cushion the rider or riders against shock, the shock-absorbing riding surface can also be constructed in other ways.

In FIGS. 5-7, for example, there is shown a sled having a shock-absorbing riding surface formed by an air-filled pad 22. The pad is of conventional ribbed configuration and is adhesively connected to the top surface of a base 23, similar to the base 10, previously described.

As in the previous embodiment, the base 23 has a curved, reinforced and cushioned nose and guide runners projecting therebeneath. In this embodiment, there are provided braces 24 at opposite sides of the sled, rigidly connecting the nose to the base at a point spaced from the front of the sled. Hand grips 25 are formed on the braces to be grasped in the same manner as the handles 14 previously described. The braces 24 assist in reinforcing the nose to prevent its collapsing against a rider.

Pad 22 does not cover the entire base 23, there being a marginal space 23a left at each side of the sled to receive the feet of a sitting rider or riders.

While the shock-absorbing surfaces have herein been described as being air-filled, and this arrangement has proven highly satisfactory, other shock-absorbing surfaces may be usable. Thus, layers of resilient rubber or plastic materials could be used.

I claim:
1. A sled comprising:
   a base constructed of strong, shape retaining, wear-resistant, sheet material having some flexibility, an upwardly curved front end forming a nose and spaced, longitudinal runners beneath the base and extending from the front end to the rear end; and
   a plurality of ring-shaped cushion members aligned substantially contiguously one after the other fixed to the upper surface of the base whereby users can sit in the cushion members and between them to be supported thereby, the outer diameter of said ring-shaped cushions being substantially less than the width of the base.
2. A sled according to claim 1, further including:
   handles rigidly fixed to the base between the resilient, shock-absorbing member and the nose, said handles projecting upwardly and outwardly from the top surface of the base.
3. A sled according to claim 1, wherein the base is aluminum.
4. A sled according to claim 1, wherein the base is fiber glass.
5. A sled according to claim 1, wherein the base is plastic.
6. A sled according to claim 1, wherein the resilient, shock-absorbing members are filled with air.

References Cited

UNITED STATES PATENTS

| | | | |
|---|---|---|---|
| 2,187,437 | 1/1940 | Wanat | 280—18 |
| 2,829,902 | 4/1958 | Stocker | 280—18 |
| 2,927,799 | 3/1960 | Schnitzler | 280—18 |
| 3,135,978 | 1/1964 | Grasmoen | 9—310 |
| 3,319,972 | 5/1967 | Gallaher | 280—18 |
| 3,374,003 | 3/1968 | Fulson | 280—18 |

FOREIGN PATENTS 218,879   12/1961   Austria.

LEO FRIAGLIA, Primary Examiner

R. R. SONG, Assistant Examiner